United States Patent
King, Jr.

(10) Patent No.: US 10,374,397 B2
(45) Date of Patent: Aug. 6, 2019

(54) NON-CONDUCTIVE SHIELD FOR DISTRIBUTION BOARDS

(71) Applicant: Warren Stanley King, Jr., Reedville, VA (US)

(72) Inventor: Warren Stanley King, Jr., Reedville, VA (US)

(*) Notice: Subject to any disclaimer, the term of this patent is extended or adjusted under 35 U.S.C. 154(b) by 74 days.

(21) Appl. No.: 15/607,901

(22) Filed: May 30, 2017

(65) Prior Publication Data

US 2017/0358907 A1 Dec. 14, 2017

Related U.S. Application Data

(60) Provisional application No. 62/347,489, filed on Jun. 8, 2016.

(51) Int. Cl.
| | |
|---|---|
| *H02B 1/14* | (2006.01) |
| *H02B 1/06* | (2006.01) |
| *H02G 3/08* | (2006.01) |
| *H02B 11/24* | (2006.01) |
| *H02B 3/00* | (2006.01) |

(52) U.S. Cl.
CPC ............. *H02B 1/14* (2013.01); *H02B 1/06* (2013.01); *H02B 3/00* (2013.01); *H02B 11/24* (2013.01); *H02G 3/081* (2013.01)

(58) Field of Classification Search
CPC ... H02B 1/14; H02B 1/06; H02B 3/00; H02B 11/24
USPC ..................... 174/121 AR, 56, 520
See application file for complete search history.

(56) References Cited

U.S. PATENT DOCUMENTS

| | | | |
|---|---|---|---|
| 7,370,608 B1* | 5/2008 | Friedman | A01K 13/006 119/850 |
| 2005/0081413 A1* | 4/2005 | Ko | G09F 11/18 40/514 |

FOREIGN PATENT DOCUMENTS

| | | | | |
|---|---|---|---|---|
| CN | 103138176 | * | 6/2013 | |
| CN | 103138176 A | * | 6/2013 | |
| JP | 2013162573 | * | 8/2013 | |
| KR | 20060125071 | * | 12/2006 | ........... H05K 5/0017 |

* cited by examiner

*Primary Examiner* — Timothy J Thompson
*Assistant Examiner* — Charles Pizzuto
(74) *Attorney, Agent, or Firm* — Dunlap Bennett & Ludwig PLLC

(57) ABSTRACT

A distribution board shield. The distribution board shield includes a drape formed of an elongated non-conductive material having a top end, a bottom end, a rear surface and a front surface. A connector is used to attach the drape within a distribution panel box so that the drape covers exposed bar buses, breaker busses and wires within the working area.

15 Claims, 3 Drawing Sheets

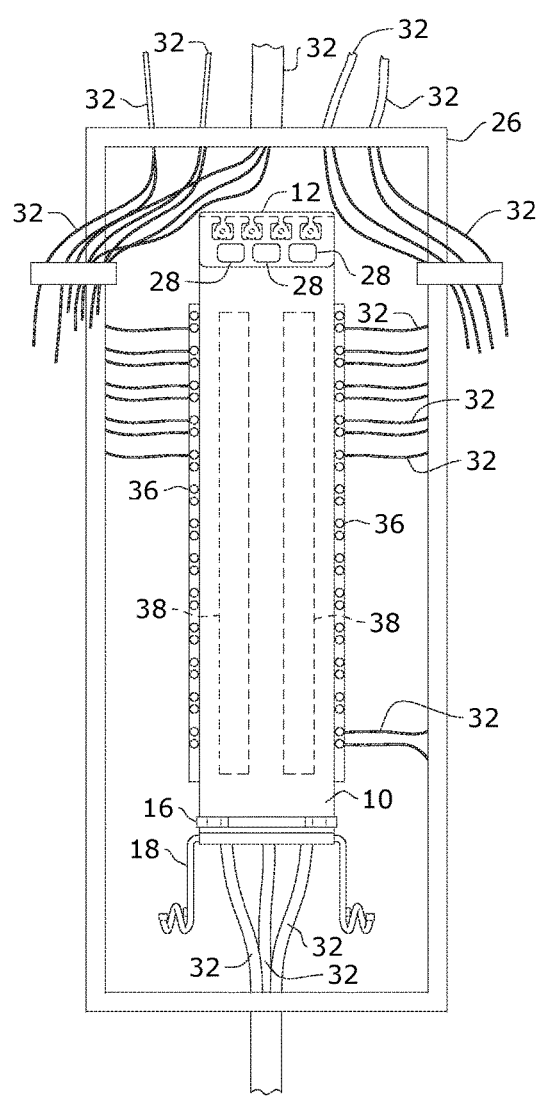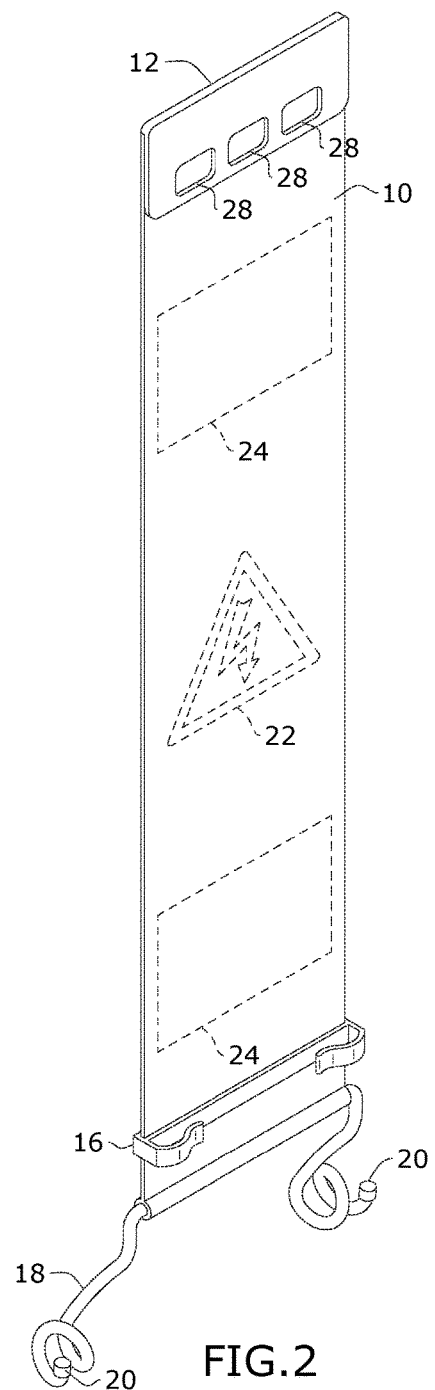
FIG.1
FIG.2

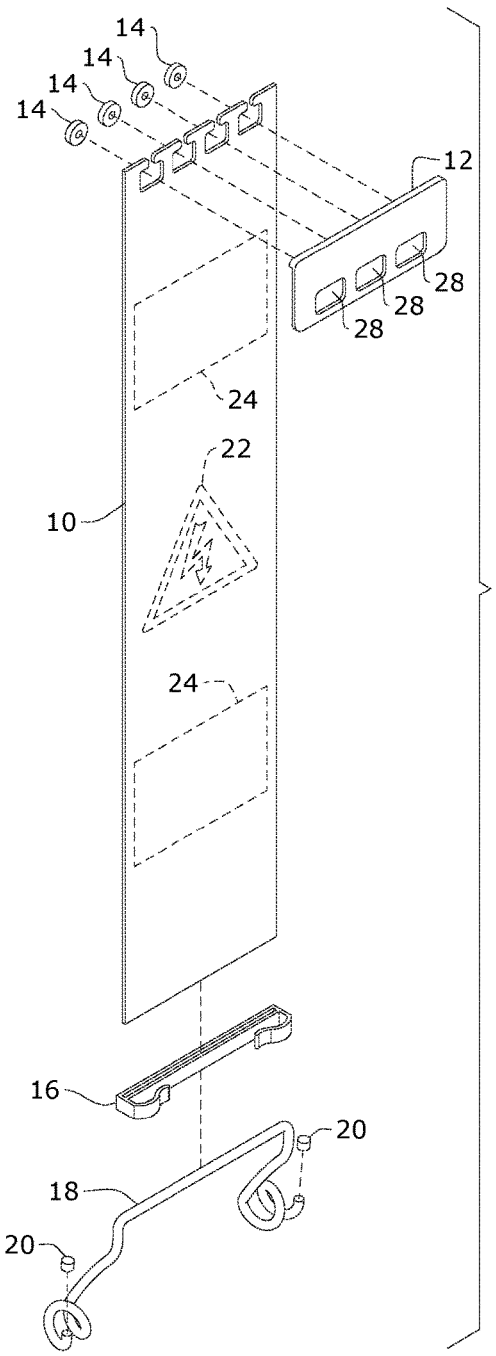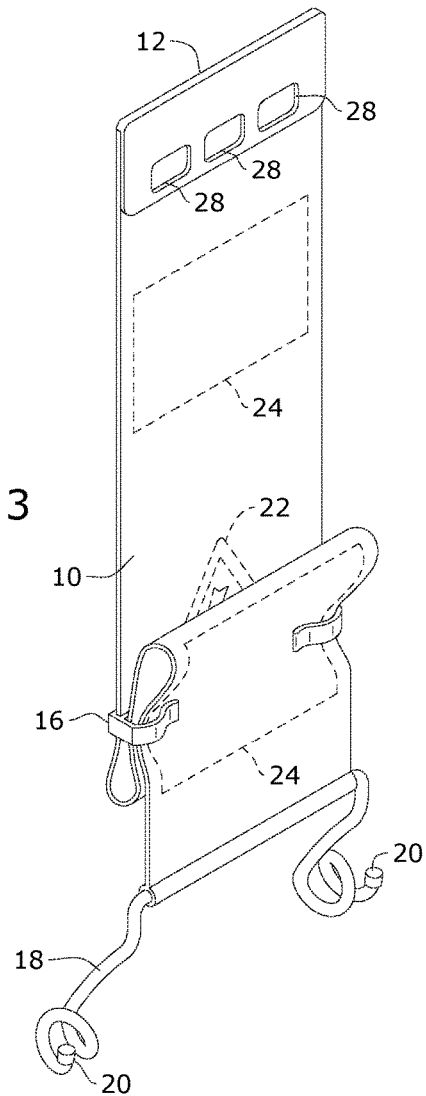

NON-CONDUCTIVE SHIELD FOR DISTRIBUTION BOARDS

CROSS-REFERENCE TO RELATED APPLICATION

This application claims the benefit of priority of U.S. provisional application No. 62/347,489, filed Jun. 8, 2016, the contents of which are herein incorporated by reference.

BACKGROUND OF THE INVENTION

The present invention relates to distribution board repair and, more particularly, to a non-conductive shield used while installing or repairing distribution boards.

A distribution board is a component of an electricity supply system that divides an electrical power feed into subsidiary circuits, while providing a protective fuse or circuit breaker for each circuit in a common enclosure. During installation of new circuits within a distribution board, electrical wires and bus bars are exposed, which puts the electrician at risk of electrical shock.

As can be seen, there is a need for a non-conductive shield to cover the exposed electrical main wires and bus bars of a distribution board.

SUMMARY OF THE INVENTION

In one aspect of the present invention, a distribution board shield comprises: a drape formed of an elongated non-conductive material having a top end, a bottom end, a rear surface and a front surface; and a connector attached to at least one of the top end and the bottom end of the drape, wherein the connector is configured to secure the drape within the distribution board box.

In another aspect of the present invention, a method of covering a distribution board comprises: providing a drape formed of an elongated non-conductive material having a top end and a bottom end; and attaching the top end of the drape within the distribution board box so that the drape hangs over and covers breaker busses.

These and other features, aspects and advantages of the present invention will become better understood with reference to the following drawings, description and claims.

BRIEF DESCRIPTION OF THE DRAWINGS

FIG. 1 is a front view of an embodiment of the present invention shown in use;

FIG. 2 is a perspective view of an embodiment of the present invention;

FIG. 3 is an exploded view of an embodiment of the present invention;

FIG. 4 is a perspective view of an embodiment of the present invention shown in a retracted position.

DETAILED DESCRIPTION OF THE INVENTION

Figure 5:
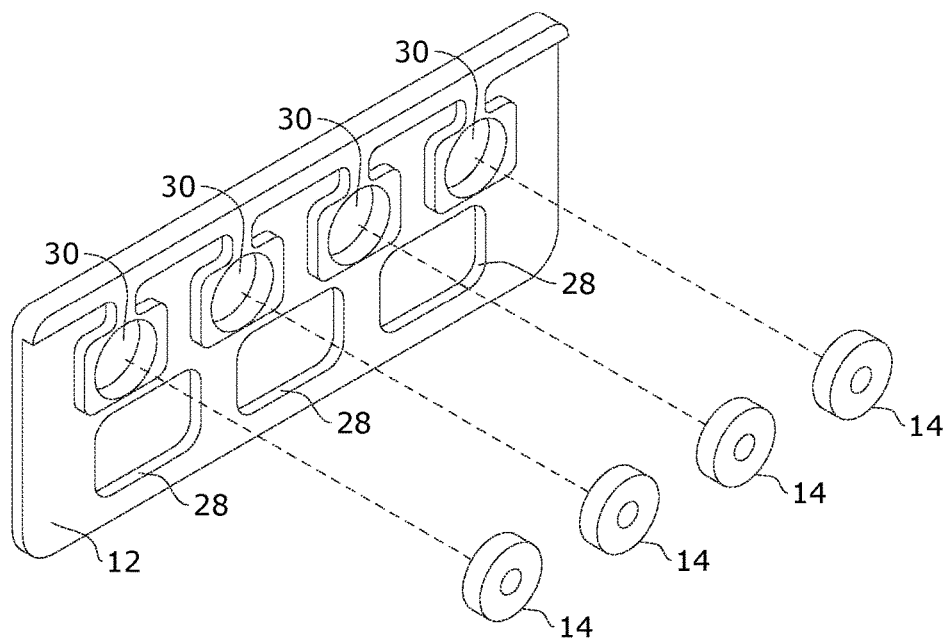
FIG. 5 is an exploded view of a handle of FIG. 2.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a non-conductive shield that is used to cover main wires and bus bars in an electrical panel to help prevent accidental electrical short and shock.

Referring to FIGS. 1 through 5, the present invention includes a distribution board shield. The distribution board shield includes a drape 10 formed of an elongated non-conductive material having a top end, a bottom end, a rear surface and a front surface. A connector 14, 18 is used to attach the drape 10 within a distribution panel box 26 so that the drape 10 covers exposed bar buses 36, breaker busses 38 and wires 32 within a working area. The connector 14, 18 may be secured to the drape 10 at the top end, the bottom end or both.

The drape 10 is made of a non-conductive material to prevent the electrician from getting electrically shocked. The non-conductive material may be rubber or any non-conductive material. The drape 10 covers the energized parts of the distribution board, such as bar buses 36, breaker busses 38 and wires 32. The non-conductive material may protect a user from up to 600 volts. In certain embodiments, the drape 10 may be about 6 inches wide by 28 inches in length, which is based on the size of current distribution boards. However, the size of the drape 10 may be altered to adjust to different sized boards and alternate needs. The drape 10 may further include a warning symbol 22 and a warning text 24 disposed on the front surface. The warning symbol 22 and text 24 may be printed or adhered to the front surface.

The shield may further include a handle 12. The handle 12 is attached to the top end of the drape 10. The handle 12 may be made of a semi-rigid to rigid non-conductive material, such as rubber or plastic. In certain embodiments, the connector 14, 18 may include at least one magnet, 14, such as a plurality of magnets 14. The magnets 14 may be embedded within slots 30 formed on the handle 12. The handle 12 may further include finger openings 28. A user may grasp the handle 12 using the finger openings 28 and releasably secure the handle 14 to a ferro-magnetic portion of the distribution board box 26 so that the drape 10 hangs over the bar buses 36 and breaker busses 38.

In certain embodiments, the connectors 14, 18 may be coiled wires 18. The coiled wires 18 may extend from either the top end or the bottom end of the drape 10. For example, a first coiled wire 18 extends from a first side of the bottom end of the drape 10 and a second coiled wire 18 extends from a second side of the bottom end of the drape 10. The first coiled wire 18 and the second coiled wire 18 may be made of a non-conductive material or may include an outer coating of a non-conductive material. Caps 20 may be connected to cover the ends of the coiled wires 18. If the main wires 32 of the distribution board 26 are disposed at a top of the distribution board box 26, the user may wrap the coiled wired 18 around the main wires 32 so that the drape 10 hangs over the bar buses 36 and breaker busses 38.

The present invention may further include a clip 16 attached to the drape 10. The clip 16 is used to adjust a length of the drape 10 for different sized distribution boards. The clip 16 may include sidewalls forming a slot in between. The drape 10 is disposed within the slot. The clip 16 further includes a first side arm and a second side arm extending from opposing sides of the sidewalls and protruding towards one another. The drape 10 may be folded upward and placed in between the sidewalls and the side arms. The side arms may apply pressure against the drape 10, holding the drape 10 in a retracted position.

A method of covering a distribution board may include the following steps: providing the drape described above; and attaching the top end of the drape within the distribution board so that the drape hangs over and covers breaker busses. A electrician installs the drape securing the coiled wires around the main wires of the distribution panel if the main wires are located at the top of the distribution panel. Otherwise, if the main wires are located at the bottom of the distribution panel, the drape is attached using the magnet above the bus bars. The clip is used for adjusting the length of the drape to match panel box/switch gear length. The present invention may be used by any telecommunication companies, e.g. phone companies, data communications, Internet providers, such as fiber optics and the like.

It should be understood, of course, that the foregoing relates to exemplary embodiments of the invention and that modifications may be made without departing from the spirit and scope of the invention as set forth in the following claims.

What is claimed is:

1. A distribution board shield comprising:
   a drape formed of an elongated non-conductive material having a top end, a bottom end, a rear surface and a front surface;
   a handle formed of a non-conductive material and coupled to the top end of the drape; and
   a magnet embedded within the handle,
   wherein
   the magnet is configured to secure the drape within a distribution board box.

2. The distribution board shield of claim 1, further comprising a first coiled wire extending from a first side of the bottom end of the drape and a second coiled wire extending from a second side of the bottom end of the drape, wherein the first coiled wire and the second coiled wire comprise an outer surface comprising a non-conductive material.

3. The distribution board shield of claim 1, wherein the non-conductive material is rubber.

4. The distribution board shield of claim 1, further comprising at least one of a warning symbol and a warning text printed on the front surface of the drape.

5. The distribution board shield of claim 1, further comprising a clip attached to the drape and operable to adjust a length of the drape.

6. The distribution board shield of claim 5, wherein the clip comprises sidewalls forming a slot in between, wherein the drape is disposed within the slot, the clip further comprising a first side arm, and a second side arm extending from opposing sides of the sidewalls and protruding towards one another.

7. A method of covering a distribution board comprising:
   providing a drape formed of an elongated non-conductive material having a top end, a bottom end, a first coiled wire extending from a first side of the top end of the drape and a second coiled wire extending from a second side of the top end of the drape, wherein the first coiled wire and the second coiled wire comprise an outer surface comprising a non-conductive material; and
   attaching the top end of the drape within the distribution board box so that the drape hangs over and covers breaker busses.

8. The method of claim 7, wherein the drape further comprises at least one magnet attached to the bottom end.

9. The method of claim 8, further comprising the step of attaching the bottom end of the drape within the distribution board by placing the magnet against a ferromagnetic portion of the distribution board.

10. The method of claim 7, wherein the step of attaching the top end of the drape comprises wrapping the first coiled wire around a first main service wire and wrapping the second coiled wire around a second main service wire.

11. The method of claim 7, wherein the non-conductive material is rubber.

12. The method of claim 7, further comprising a clip attached to the drape and operable to adjust a length of the drape.

13. The method of claim 12, wherein the clip comprises sidewalls forming a slot in between, wherein the drape is disposed within the slot, the clip further comprising a first side arm and a second side arm extending from opposing sides of the sidewalls and protruding towards one another.

14. A distribution board shield comprising:
   a drape formed of an elongated non-conductive material having a top end, a bottom end, a rear surface and a front surface; and
   a first coiled wire extending from a first side of the bottom end of the drape and a second coiled wire extending from a second side of the bottom end of the drape, wherein the first coiled wire and the second coiled wire comprise an outer surface comprising a non-conductive material, wherein
   the first coiled wire and the second coiled wire are configured to secure the drape within a distribution board box.

15. A distribution board shield comprising:
   a drape formed of an elongated non-conductive material having a top end, a bottom end, a rear surface and a front surface;
   a clip attached to the drape and operable to adjust a length of the drape, wherein the clip comprises sidewalls forming a slot in between, wherein the drape is disposed within the slot, the clip further comprising a first side arm, and a second side arm extending from opposing sides of the sidewalls and protruding towards one another; and
   a connector attached to at least one of the top end and the bottom end of the drape, wherein
   the connector is configured to secure the drape within a distribution board box.

* * * * *